United States Patent [19]

Inagaki

[11] Patent Number: 4,945,591
[45] Date of Patent: Aug. 7, 1990

[54] CUSHIONLIKE ITEM WITH PROJECTIONS ATTACHED THERETO BY STRINGS

[76] Inventor: Jitsuo Inagaki, 71, Aza Kamiyashiki, Itsusikicho Hazugun, Aichi, 444-04, Japan

[21] Appl. No.: 454,020

[22] Filed: Dec. 20, 1989

Related U.S. Application Data

[62] Division of Ser. No. 294,566, filed as PCT JP87/00146 on Mar. 10, 1987 published as WO88/06857 on Sep. 22, 1988, Pat. No. 4,924,541.

[51] Int. Cl.$^5$ .................. A47G 9/00; A47C 31/00
[52] U.S. Cl. .................................... 5/472; 5/437; 5/448; 297/231; 297/452; 297/460
[58] Field of Search .................. 5/448, 434, 436, 471, 5/472, 431, 437; 297/452, 460, 231

[56] References Cited

U.S. PATENT DOCUMENTS 1,730,771  10/1929  Jonas ..................................... 5/472
1,753,359  4/1930   Bechik .................................. 5/472
4,754,511  7/1988   Sargent ................................. 5/431

FOREIGN PATENT DOCUMENTS 19409 of 1898  United Kingdom ..................... 5/472
6100  of 1902  United Kingdom ..................... 5/448

Primary Examiner—Alexander Grosz
Attorney, Agent, or Firm—Donald W. Hanson

[57] ABSTRACT

A bed pad, an automobile seat pad, a pillow or a similar cushionlike item having therapeutic effects similar to those of finger pressure therapy, a good airing function and an improved adaptability to the head or waist of the user is provided. A cushionlike item according to the present invention has a series of continuously arranged bag portions containing a large number of stuffing elements of synthetic resin. The pad has on its front surface a plurality of projections that can apply pressure or spot therapy to a user's body. The projections are secured to the pad by strings arranged zig-zag between the front and back surfaces of the pad. Upon pulling of the strings, the cushion can be tightened, causing the projections to stand firmly on the front surface.

3 Claims, 18 Drawing Sheets

FIG. 32
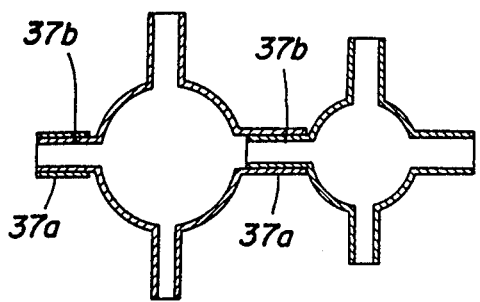
FIG. 33(a)  FIG.33(b)  FIG.33(c)
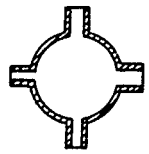 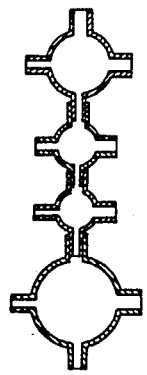 
FIG. 33(d)  FIG. 33(e)
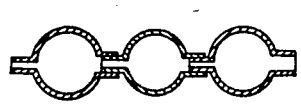 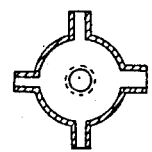

FIG.33(f) FIG.33(g) FIG.33(h)
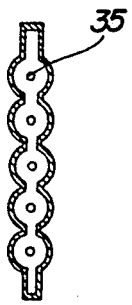
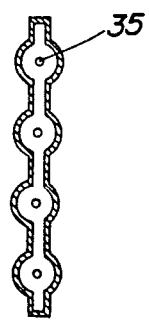
FIG.33(i)
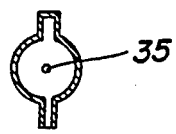

CUSHIONLIKE ITEM WITH PROJECTIONS ATTACHED THERETO BY STRINGS

This application is a divisional application of application Ser. No. 294,566, filed as PCT JP87/00146 on Mar. 10, 1987, published as WO88/06857 on Sep. 22, 1988, Pat. No. 4,924,541.

FIELD OF THE INVENTION

The present invention relates to a bed pad, an automobile seat pad, a pillow or a similar cushionlike item having therapeutic effects similar to those of finger pressure therapy or massage for curing or reducing kinks or stiffened or sore neck and back muscles.

BACKGROUND OF THE INVENTION

Cushions and other cushionlike items such as pillows containing kapok, fibre, cotton, down, wool, buckwheatchaff, sponge and the like are well known. However, such an item is generally accompanied by certain disadvantages such as absorbing and retaining moisture from the exterior to become too wet and warm after a long period of use, in the case of a pillow, to keep the user's head cool enough to ensure an easy and comfortable sleep, and providing an unclean condition that can encourage germs and worms to proliferate. In order to eliminate these and other disadvantages, a pillow or a cushion using a mesh bag as a case and a number of small and short cylindrical plastic elements as stuffing has been proposed. A pillow or a similar item having such a construction generally has a good airing function and can meet the requirements of cooling the head and of having a height adjustability to provide ease and comfort of users. While such items have an advantage for providing comfort of easy and good sleep, they do not have any noticeable therapeutic effects of promoting blood circulation and curing kinks and sore muscles, effects similar to those that can be brought forth by finger pressure therapy and other physical therapeutic measures applicable to muscles and blood circulation.

A driver who has been driving an automobile for a long period of time can have a heavy fatigue and sore muscles and sometimes can fall in a heavy drowsiness, which will force him or her to pull in a drive-inn for rest and to spend some time until he or she can recover and resume driving to head for the destination. It would be very advantageous for an automobile driver if his or her car is equipped with a seat pad having the therapeutic effects of physically maintaining the driver's posture in the correct position, softening stiffened muscles of the neck, back and waist, promoting blood circulation and preventing excessive perspiration due to the warm seat by means of a good airing function of the seat.

While a conventional bed pad, which is generally made of wool, synthetic fibre or cotton textile and placed between the bed sheet and the mattress of a bed, may be good for an easy and comfortable sleep, it does not have any therapeutic effects similar to those of finger pressure therapy of promoting blood circulation and curing kinks nor effects of keeping its temperature and humidity to a level which is required to ensure an easy and comfortable sleep.

Differently stated, conventional cushions and other cushionlike items are mostly soft cushions and do not have therapeutic effects of physically keeping user's posture in good position and promoting blood circulation of his or her body that hard cushions can claim they possess.

Therefore, an object of the present invention is to provide a bed pad, an automobile seat pad, a pillow or a similar cushionlike item having the effects of promoting blood circulation, curing kinks and other sore muscles similar to those of spot or finger pressure therapy and holding the user's posture in a correct position.

Another object of the present invention is to provide a bed pad, an automobile seat pad, a pillow or a similar cushionlike item which contains short cylindrical stuffing elements having an improved airing function by increasing space among them without forming grooves on the outer peripheral surface of the cylindrical elements.

Still another object of the present invention is to provide a cushionlike item which is hard and rigid enough to keep itself in a form adapted to hold the head (or the waist) of the user and at the same time is soft and flexible enough to adjust its height to ensure user's comfort when used as a pillow by providing composite stuffing elements having a high coefficient of friction between one another.

A further object of the present invention is to provide a bed pad, an automobile seat pad, a pillow or a similar cushionlike item with stuffing of hollow spherical elements of synthetic resin arranged in a plurality of vertical and horizontal rows in order to provide a good airing function and generate therapeutic effects similar to those of finger pressure therapy of promoting blood circulation.

SUMMARY OF THE INVENTION

A cushionlike item ,according to the present invention is characterized by the item comprising a series of multifunctional oblong bag portions containing a large number of small stuffing elements of synthetic resin.

A stuffing element according to the present invention can have a shape of a short cylinder, a short trigonal prism with rounded edges or a hollow ball of synthetic resin. Such a spherical element may be used either independently or connected with others to form a string of beads.

When a cushionlike item according to the present invention is to be used as a seat pad in an automobile or in a living room, it preferably contains small hollow balls of synthetic resin or strings of such small hollow balls of synthetic resin that can provide a comfortable and soft touch to the user and an airing function as well as an effect of spot pressure therapy.

The synthetic resin to be used for a stuffing element according to the present invention may be, for example, a hard synthetic resin such as vinyl chloride. Stuffing elements according to the present invention made of such a synthetic resin can give a comfortable touch to the body portions of the use that come to contact with the elements because of the appropriate rigidity and flexibility they possess.

A cushionlike item according to the present invention is also characterized by the item having a large number of short cylindrical stuffing elements contained therein, a number of strings arranged zigzag along the front and back surfaces thereof and a number of projections provided on the front side thereof for spot pressure therapy, said stuffing elements becoming rigidly held by pulling said strings to make the projections firmly standing on the surface of the cushionlike item.

A cushionlike item according to the present invention is also characterized by the item containing a large number of hollow and spherical stuffing elements of synthetic resin, said stuffing elements being connected together with strings to form strings of beads which are arranged vertically and horizontally in the bag of the cushion item in order to increase its airing function and to avoid extremely uneven distribution of the elements in the bag that can deteriorate the spot pressure therapeutic effects of the synthetic resin balls.

The above objects and other objects as well as the advantages of the present invention will become apparent from a consideration of the following detailed description in conjunction with the accompanying drawings illustrating preferred embodiments of the present invention.

BRIEF DESCRIPTION OF THE DRAWINGS

FIG. 32 is an enlarged view of encircled area A of FIG. 31.

FIGS. 33(a) through (i) are sectional views of one or more than one stuffing elements according to the invention arranged in five different ways.

DETAILED DESCRIPTION OF PREFERRED EMBODIMENTS OF THE INVENTION

Now the invention will be described in greater detail by referring to the accompanying drawings.

Figure 1:
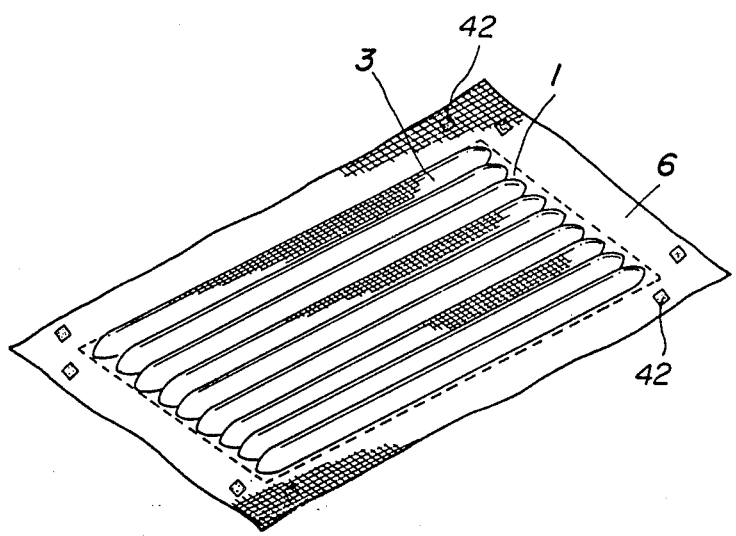
FIG. 1 is a perspective view of a seat pad according to the present invention.
Figure 2:
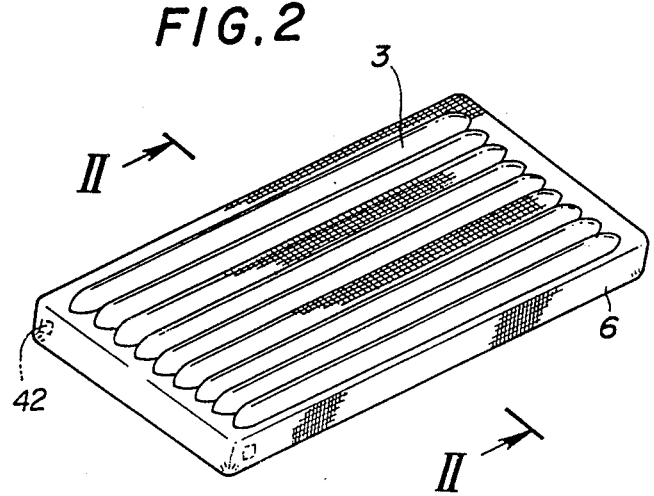
FIG. 2 is a perspective view illustrating the seat pad of FIG. 1 arranged on a mattress.
Figure 3:
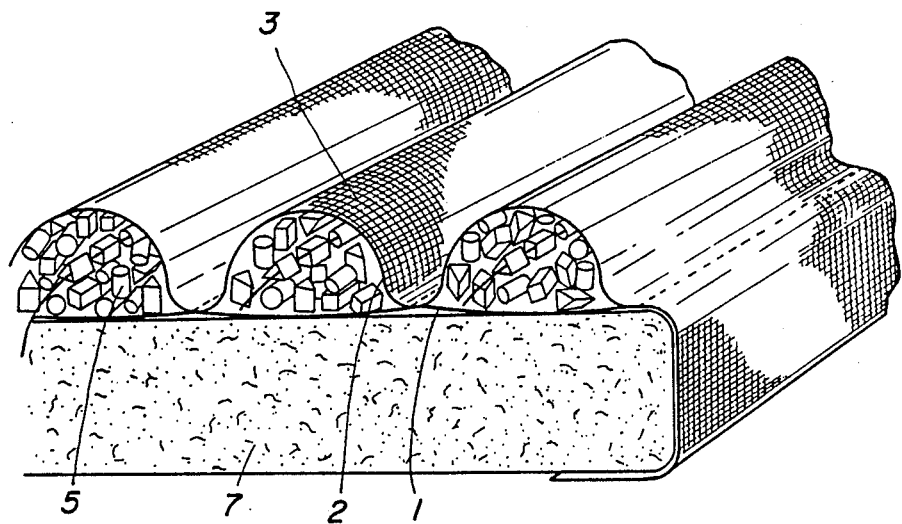
FIG. 3 is a lateral sectional view of the seat padmattress combination of FIG. 2.

As shown in FIGS. 1 through 3, meshed cloth sheet 1 and meshed cloth sheet 2 are stitched together to form a continuous series of oblong bag portions 3 of a bed pad with cloth sheet 1 constituting a flat side, said bag portions 3 being filled with a large number of stuffing elements 5 of synthetic resin. In FIGS. 1 and 2, reference numeral 6 denotes marginal areas of the bed pad to be wrapped around mattress 7 (see FIG. 3) and anchored thereto by means of fasteners (sticky tapes) 42 so as to cover mattress 7 like a bed sheet.

Figure 29:
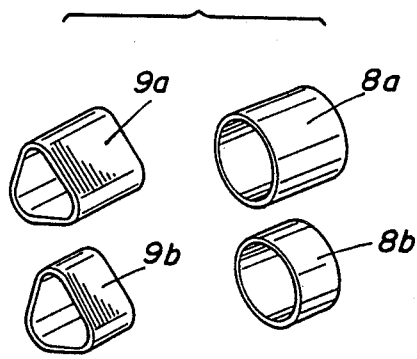
FIG. 29 is a perspective view illustrating four differently shaped stuffing elements according to the present invention.

Bag portions 3 are filled with stuffing elements consisting of a large number of short cylindrical elements 8a, 8b of synthetic resin and a large number of trigonal prism shaped elements with rounded edges 9a, 9b, both said short cylindrical elements 8a, 8b and said trigonal prism shaped elements with rounded edges 9a, 9b comprising shorter and longer versions (see FIG. 29 for examples of these elements).

When a user lays his or her body on the bed pad as described above, the well devised composition and the flexibility of the stuffing elements exert an effect of promoting blood circulation with a slight movement of the shoulder, back, waist or legs of the user. The backside or rear of the bed pad has a substantially flat surface and a user may use the bed pad upside down if it makes him or her more comfortable.

Figure 4:
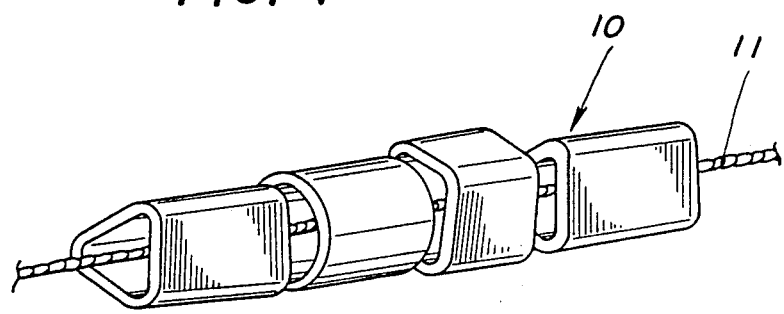
FIG. 4 is a perspective view of stuffing elements to be used in a seat pad according to the present invention.

While stuffing elements 5 of the above embodiment may be connected together by means of a string 11 as shown in FIG. 4 with a view to avoid free movement thereof before they are filled in a bag portion of the embodiment, such an arrangement is not necessarily required.

Figure 5:
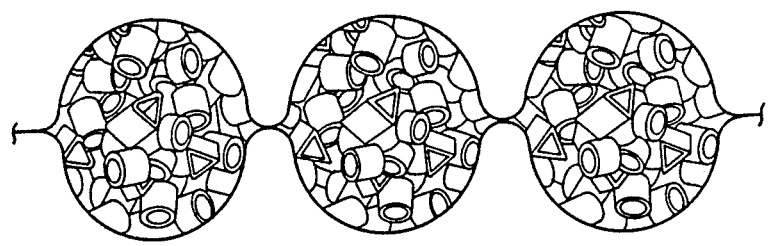
FIGS. 5 through 7 are sectional views of so many other embodiments of the cushionlike item according to the present invention.
Figure 6:
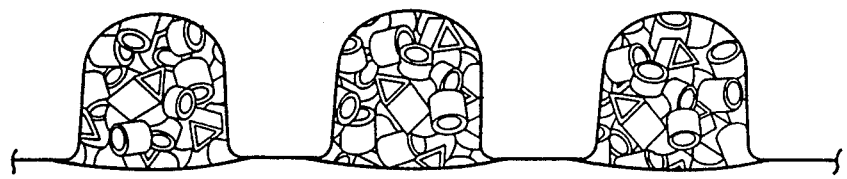
Figure 7:
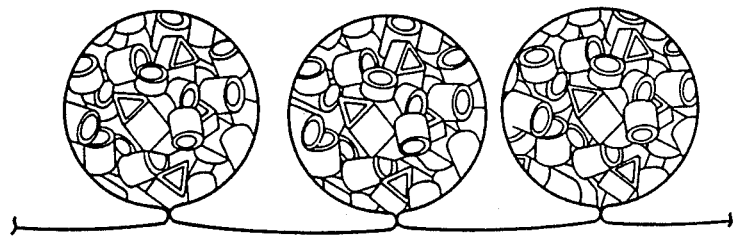

FIGS. 5 through 7 show three other embodiments of the bed pad according to the present invention, of which FIG. 5 illustrates an embodiment having cylindrical bag portions formed continuously by the front (upper) and back (lower) meshed cloth sheets thereof and FIG. 6 illustrates an embodiment having ridges formed on the front side thereof with a space provided between two neighboring ridges, while FIG. 7 illustrates an embodiment having cylindrical ridges formed on the front side thereof.

Since a bed pad according to the invention comprises a large number of small stuffing elements contained therein, it can be easily folded as desired and can be subjected to washing whenever necessary without deteriorating its quality.

Since a bed pad according to the invention has a good airing function and excellent therapeutic effects, it can be advantageously used for an aged person who stays in bed without causing bedsores. It can also be advantageously used in a family having a small child because it effectively eliminates the urine that has been accidently discharged into the bed pad by the child.

Figure 8:
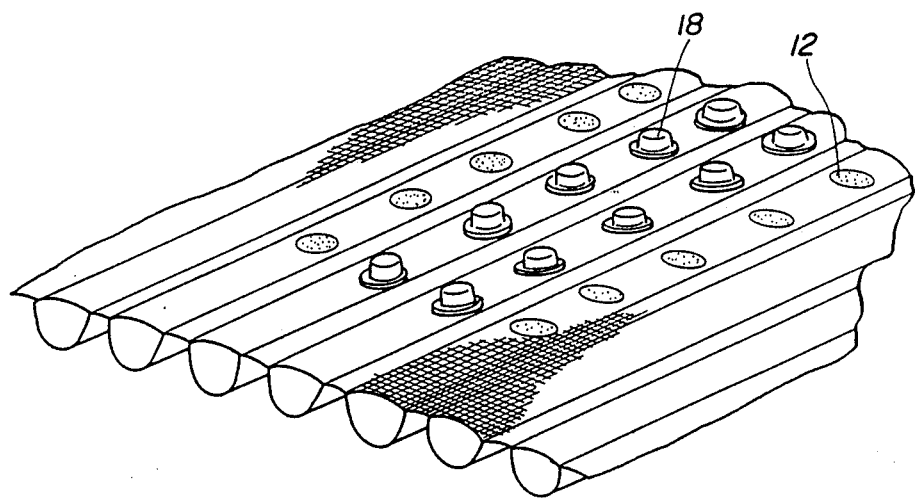
FIG. 8 is a perspective view of a cushionlike item according to the present invention provided with projections for spot pressure therapy on the back side of the item.
Figure 9:
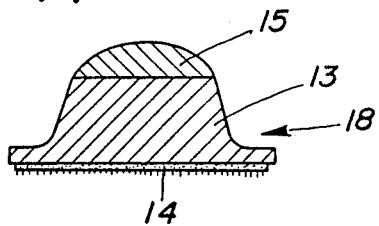
FIG. 9 is a sectional view of a projection for spot pressure therapy held upright on the surface of a seat pad according to the present invention.

A bed pad according to the present invention may be provided with a number of pieces of sticky tape 12 on its back side as shown in FIG. 8, each of said sticky tape pieces 12 is so designed as to removably hold a chip 18 having a protrusion 13 on its top provided with a permanent magnet 15 to be used for spot pressure therapy when attached to the sticky tape piece to form a projection on the bed pad as is shown in FIG. 9. Having such a construction, a bed pad according to the present invention can be advantageously used as a spot pressure device for curing kink of the user in synergism with the effect of the magnetic force of magnet 15.

Figure 10:
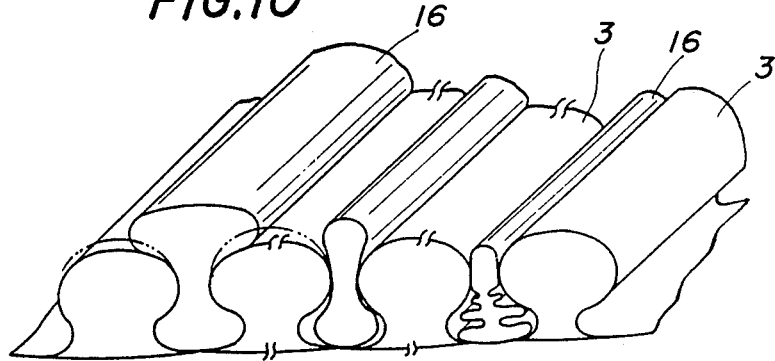
FIG. 10 is a sectional perspective view of a seat pad according to the present invention illustrating air cells arranged between bag portions formed in a row.
Figure 11:
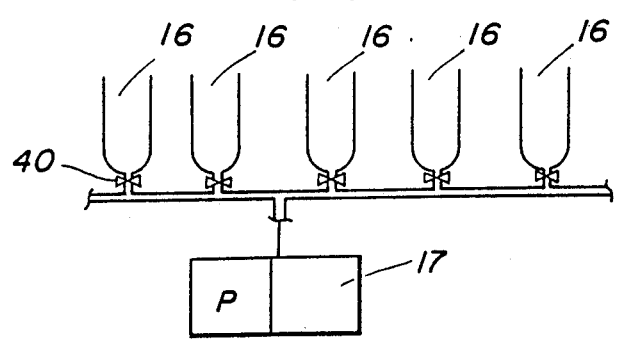
FIG. 11 is a schematic illustration of the arrangement of the air cells of FIG. 10 and the way in which they are inflated.

FIG. 10 illustrates an embodiment of the bed pad according to the present invention comprising oblong air cells 16 arranged in such a manner that each of said cells 16 is placed between two neighboring bag portions 3 and designed in such a manner that they can be inflated or deflated by means of pump p which pressurize or depressurize tank 17 as is shown in FIG. 11 to adjust the inner pressure of the air cells so that the user's body may be supported both by air cells 16 and bag portions 3. Such an arrangement is advantageous in that it avoids a situation where the body is supported by the bed pad by relatively narrow areas and that it nevertheless has a massaging effect for promoting blood circulation. Hence such an arrangement may be advantageously used for an elderly person staying in bed every day as it can effectively prevent the user from suffering from bedsores and stagnated blood circulation which can be caused as a result of staying in bed for a long period of time.

Figure 12:
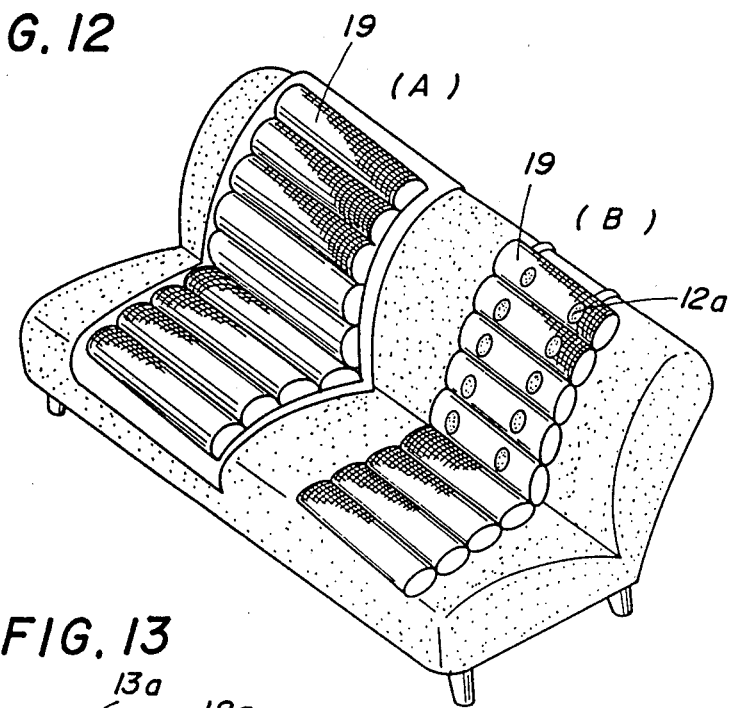
FIG. 12(A) is a perspective view of a seat pad according to the present invention showing its front side as the pad is fitted on an automobile seat and FIG. 12(b) is a similar view showing its back side.

FIGS. 12(A) and 12(B) illustrate a cushionlike item according to the invention designed to be used as a seat pad of an automobile, the item comprising a series of continuous oblong bag portions 19 formed by stitching a pair of meshed cloth sheets together and filled with a large number of stuffing elements. In FIG. 12, left side A illustrates the seat pad placed on an automobile seat with its front side having ridges facing outside, while right side B illustrates the seat pad with its substantially flat back side facing outside. With such arrangements, the pad can provide spot pressure at two different level that can be selected in accordance with the physical condition as well as the preference of the user.

Figure 13:
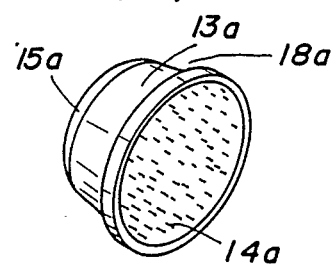
FIG. 13 is a perspective view of a projection for spot pressure therapy to be fitted on an automobile seat pad according to the present invention.

The surface of the back side of the above described seat pad is provided with a number of pieces of sticky tape 12a, to each of which chip 18a (see FIG. 13) to be used for spot pressure therapy may be removably fitted. Said chip 18a comprises protrusion 13a at its top provided with a small permanent magnet 15a and a piece of sticky tape 14a at the bottom that corresponds to sticky tape piece 12a. It may be apparent that the above described seat pad which is originally designed for use in an automobile may be used at any place as a spot pressure therapeutic device.

Figure 14:
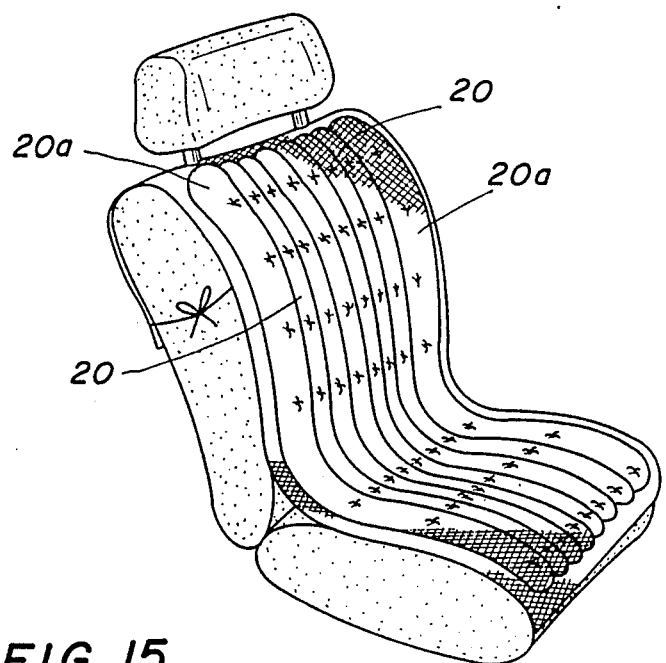
FIGS. 14 and 15 are perspective views illustrating different embodiments of the automobile seat pad according to the present invention.

FIG. 14 illustrates another embodiment of the seat pad according to the invention to be used in an automobile, said seat pad comprising a number of oblong bag portions 20 formed by stitching two meshed cloth sheets together and arranged side by side in vertical direction. The two bag portions 20a formed at the extremities of the seat pad have dimensions larger than those of the rest of the bag portions with the view of increasing adaptability of the seat pad to the sides of the user's waist.

Figure 15:
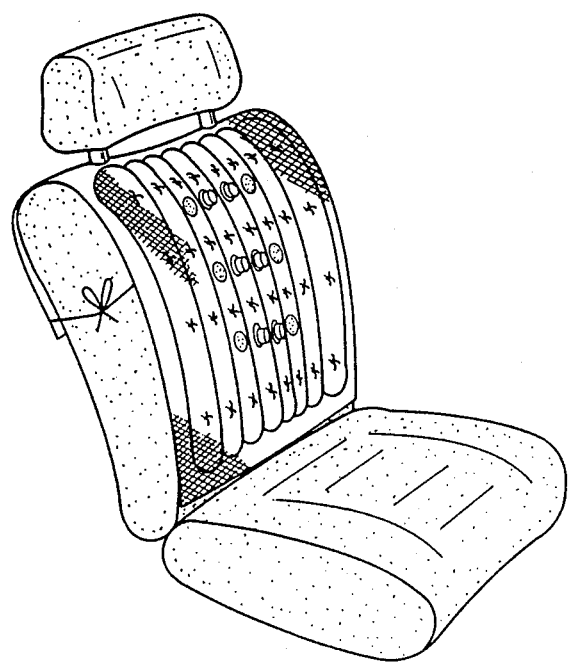

FIG. 15 illustrates still another embodiment of the seat used adapted to be used in an automobile according to the present invention which has dimensions which are suitable for supporting just the back of the user.

It should be noted that a cushionlike item according to the present invention comprising a number of oblong bag portions which are filled with a large number of small stuffing elements may be used as a pillow as well as a seat pad for an automobile.

Figure 16:
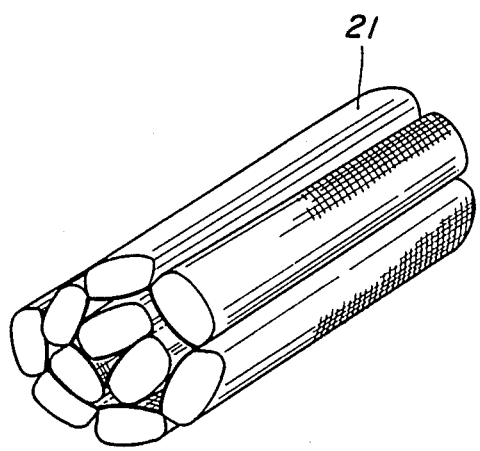
FIG. 16 is a perspective view of an automobile seat pad according to the present invention rolled up in such a manner that the side on which its ridges are formed is facing outside.
Figure 17:
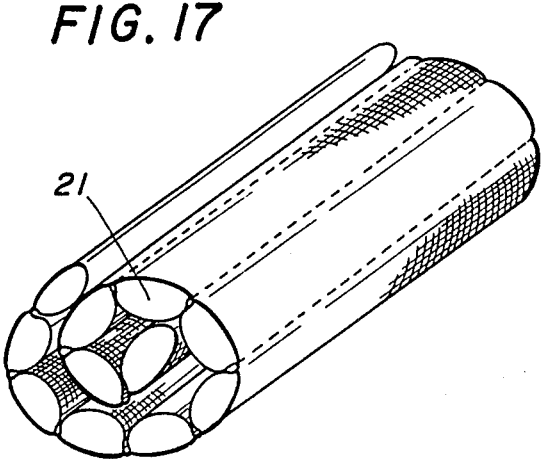
FIG. 17 is a perspective view of an automobile seat pad according to the present invention rolled up in such a manner that its flat side is facing outside.

FIG. 16 shows a seat pad rolled up in such a manner that the side on which its ridges 21 are formed is facing outwardly whereas FIG. 17 illustrates the seat pad of FIG. 16 rolled up in such a manner that the side on which its ridges 21 are formed is facing inside. As seen from two illustrations, a seat pad having a construction in which two meshed cloth sheets are stitched together to form oblong bag portions only on one side can be utilized in two different ways with different specific levels of pressure applicable to the user when rolled up with a view to use it as a pillow. It would be needless to say that it can be used as a seat pad for an automobile when it is unrolled.

An automobile seat pad according to the invention can be fitted to an automobile seat either by means of a number of strings attached to the pad or by using removable attaching means such as sticky tape pieces or spring hooks.

Figure 18:
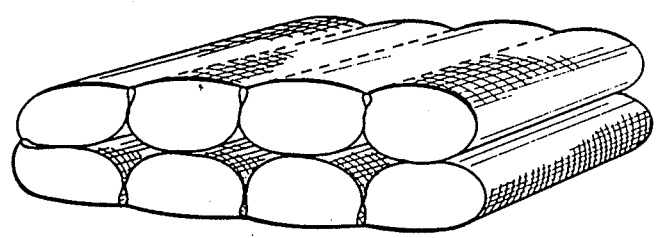
FIG. 18 is a perspective view illustrating an automobile seat pad according to the present invention folded in two so that it may be used as a pillow.
Figure 19:
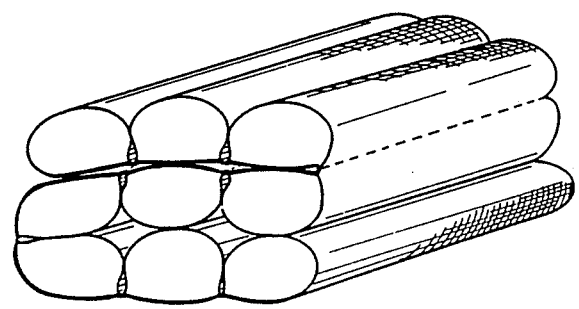
FIG. 19 is a perspective view illustrating an automobile seat pad according to the present invention folded in three portions so that it may be used as a pillow.
Figure 23:
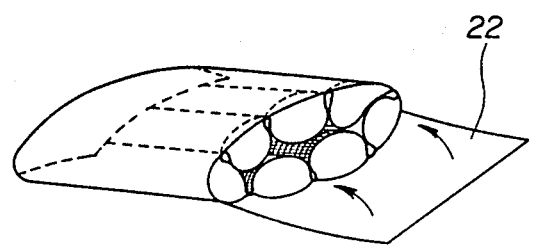
FIG. 23 is a pillow case to be used with a two- or three-folded pillow of the present invention.

An automobile seat pad according to the invention can be used as a pillow by folding it in two or three segments as shown in FIGS. 18 and 19. Also it may be used either independently or which it is contained in a pillow case 22 as shown in FIG. 23.

Figure 20:
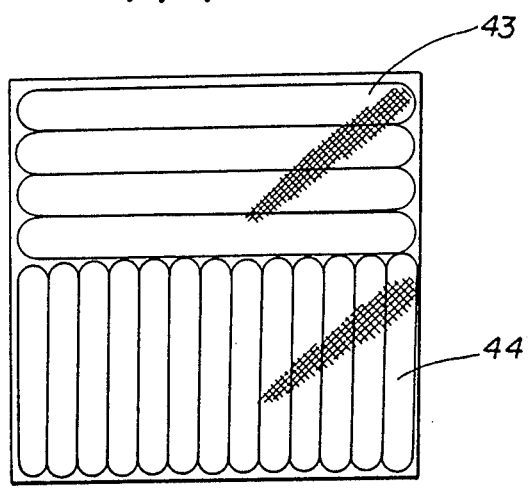
FIG. 20 is an upper plan view of a pillow according to the present invention.

FIG. 20 illustrates still another embodiment of the pillow according to the present invention comprising a number of relatively large bag portions 43 arranged horizontally on its upper portion and a number of relatively small bag portions 44 arranged vertically on its lower portion. When it is folded into two along the border line between the two portions to form a pillow with ridges facing toward the outside, the pillow will be provided with two sides having different levels of pressure to be applied to the user's head.

Figure 21:
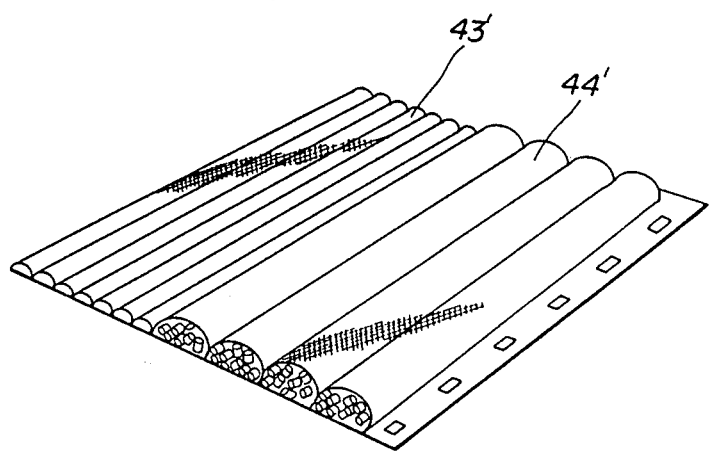
FIG. 21 is a partially cut-out perspective view of a pillow according to the present invention.

FIG. 21 illustrates an embodiment similar to that of FIG. 20, in which, however unlike the latter, ridges of two different dimensions 44' and 43' are arranged in the same direction. As in the case of FIG. 20, such an arrangement also produces a pillow having two different levels of pressure selectively applicable to the user'a head.

Figure 22:
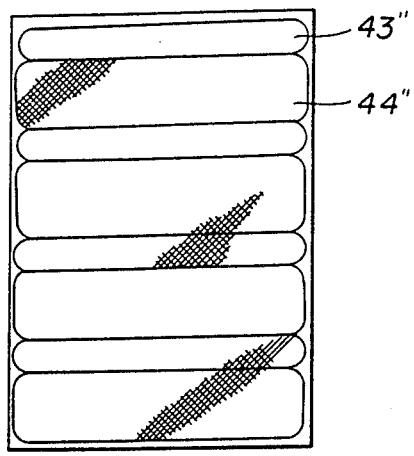
FIG. 22 is an upper plan view of another embodiment of the pillow according to the present invention.

FIG. 22 shows still another embodiment of the pillow according to the present invention in which small bag portions 43" and large bag portions 44" are alternately arranged on one side of the pillow. When the pillow is folded into two with ridges facing outwardly the user can selectively obtain different levels of pressure applied to his or her head only by slightly shifting the position of the head on the pillow.

Figure 24:
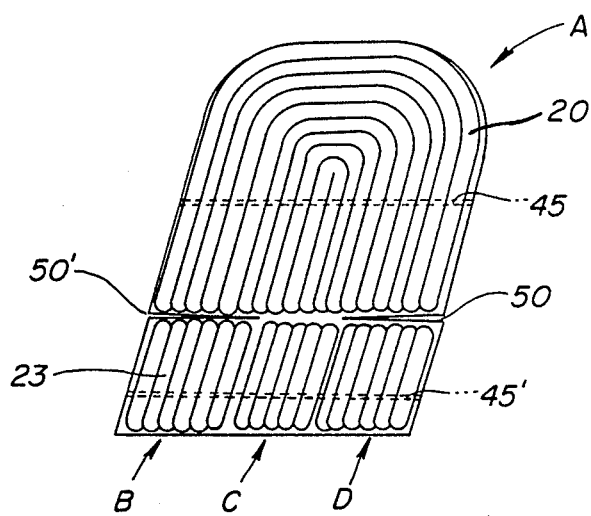
FIG. 24 is a schematic perspective view of a cushion according to the present invention.
Figure 25A:
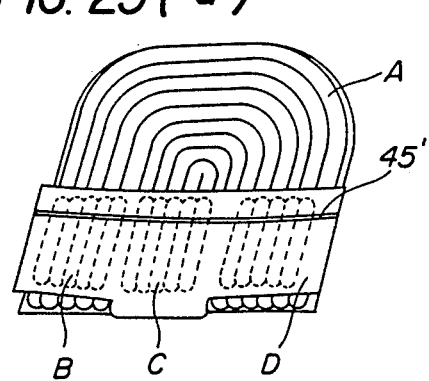
FIGS. 25(a) through 25(c) are schematic perspective views of the cushion of FIG. 24 illustrating three different ways in which it can be folded to prevent numbness of the user's legs while he or she is sitting on it.
Figure 25B:
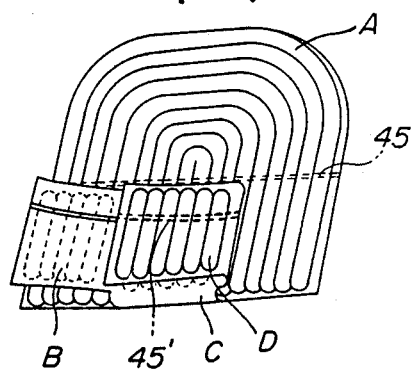
Figure 25C:
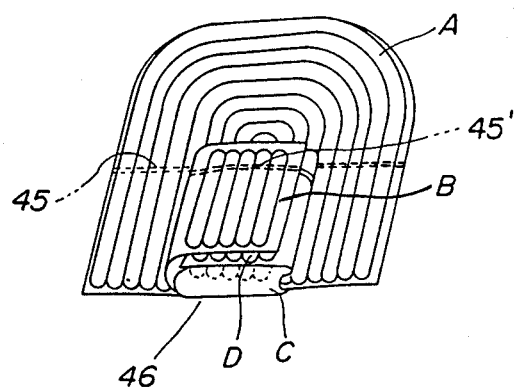

FIG. 24 illustrates an embodiment of the cushion according to the present invention comprising on one side bag portions A forming a number of semicircuclar ridges 20 arranged in parallel and bag portions B, C and D forming a number of longitudinally arranged straight ridges 23, of which bags portions A and B and A and bag portions D are respectively detachably connected with one another by means of zippers 50' and 50, ridges 20 and 23 being filled with a large number of small stuffing elements of synthetic resin. Zippers 45, 45' are provided on the other side of the cushion so that the stuffing elements may be taken out by opening the zippers. When this cushion is folded in such a manner as shown in FIG. 25(a) so that bag portions B, C and D are over bag portion A, then in a manner as shown in FIG. 25(b) so that bag portion D is lapped on bag portion C and finally as shown in FIG. 24(c) so that bag portions B are lapped on bag portions D, there will be formed a lump 46 that can serve for preventing the legs from becoming numb after long time of sitting thereon.

Figure 26:
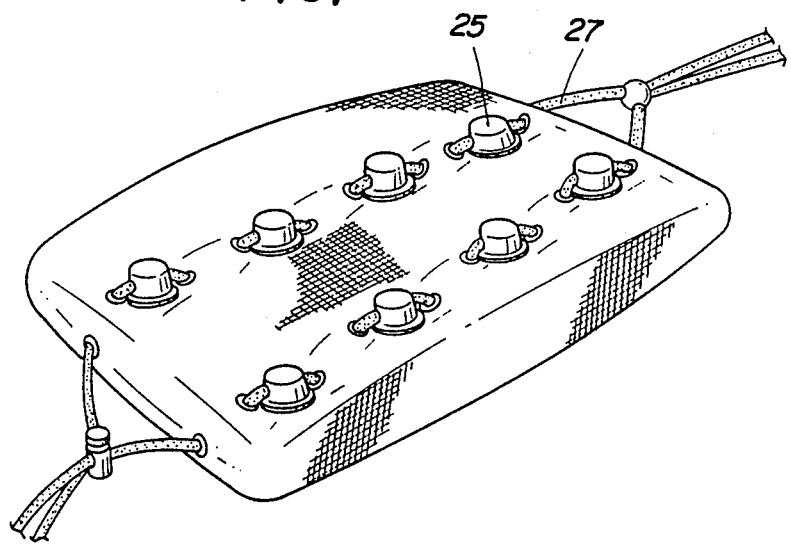
FIG. 26 is a perspective view of still another embodiment of the pillow according to the present invention.
Figure 27:
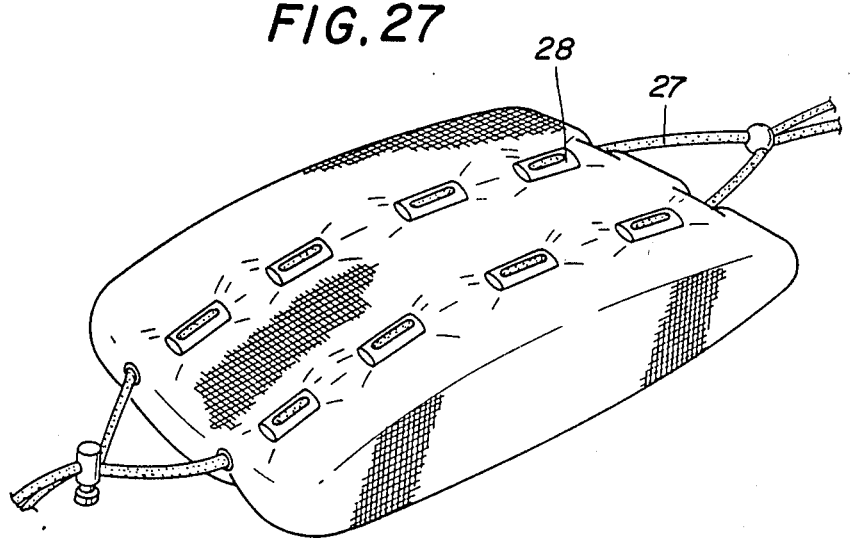
FIG. 27 is a perspective view illustrating the back side of the embodiment of FIG. 26.
Figure 28:
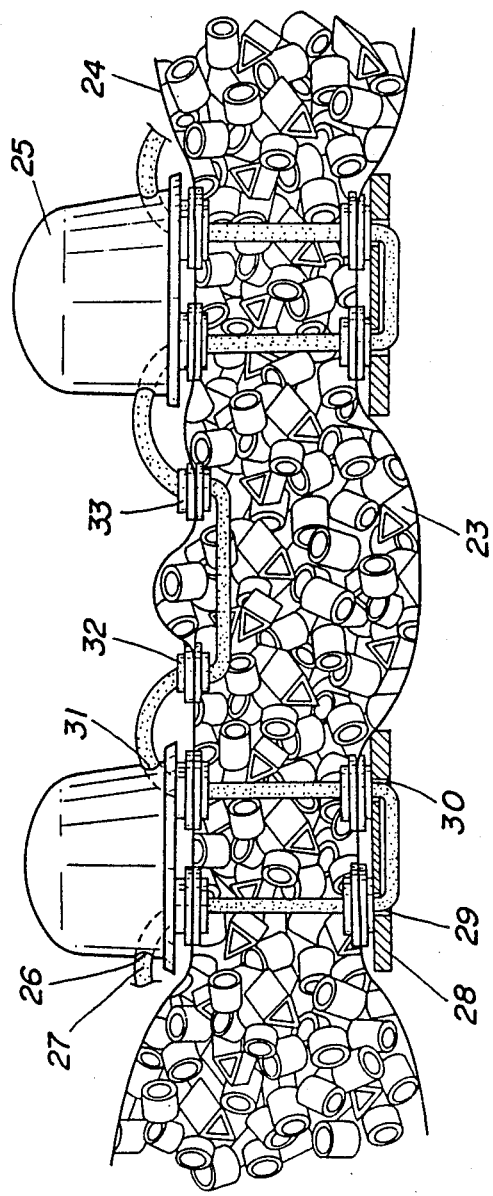
FIG. 28 is a partial sectional view of the embodiment of FIG. 26.

FIGS. 26 through 28 illustrate another embodiment of the present invention which can be used both for an automobile seat pad and a pillow, the embodiment comprising a number of bag portions 24 containing a large number of short cylindrical stuffing elements 23. This embodiment also includes a number of spot pressure therapeutic chips 25 projecting above the surface of the pad and anchored by string 27 to the pad that runs through a pair of through bores 26 of chip 25 formed in its lower portion to connect the chips one another as best shown in FIG. 28. String 27 goes into one of the bores 26 of chip 25 located on the front side of the pad from the lateral side of the chip, comes out of the opening of the bore found at the bottom thereof, proceeds to hole 29 provided on anchor plate 28 attached to the back side of the pad, goes through the other hole 30 of the anchor plate and then through the other through bore 31 of the chip, enters bag portion 24 through eyelet 32 and comes out through eyelet 33 and then goes into the adjacent chip through its lateral opening of one of its bores. With such a construction as described above for a seat pad, the projections of the pad formed by chips can be firmly and rigidly held onto the pad by pulling the strings. Therefore, it will be understood that the level of pressure to be applied to the body or the head of the user by the chips for spot pressure therapy can be adjusted by altering the degree of tension of the strings that hold the chips. It may be advisable that the pad be used with the backside facing outwardly when it is used as an ordinary pillow.

A pillow having such a configuration can be utilized in a manner similar to that of using an ordinary spot pressure therapeutic device. For example, the neck may be placed on the pillow so that the back of the neck is pressed against projections of the pillow and then moved back and forth or right and left to administer a spot pressure therapy. Similarly, the back of the body may be placed on the pad so that the back is pressed against the projections and moved in lateral directions with the body weight being held with the right and the left halves of the back alternately.

Figure 30:
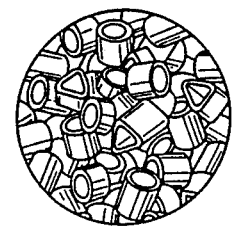
FIG. 30 is a schematic illustration of stuffing elements packed in the case of a cushionlike item according to the present invention.

While a stuffing element of synthetic resin to be used for a cushionlike item according to the present invention can take the form of a short cylinder, a small hollow ball or the like, when a mixture of short cylindrical elements 8a, 8b and trigonal prisms 9a, 9b with rounded edges, each type of element having a longer and a shorter versions, is used as shown in FIG. 29, contact areas between peripheries of cylindrical elements and trigonal prisms are significantly reduced and those between peripheries of elements and openings of cylindrical elements are significantly increased. Thus vertically elongated spaces are formed among the elements which in turn improve the airing function of the pad and provide an enhanced adaptability to the head and the waist of the user's body (see FIG. 30).

Figure 31:
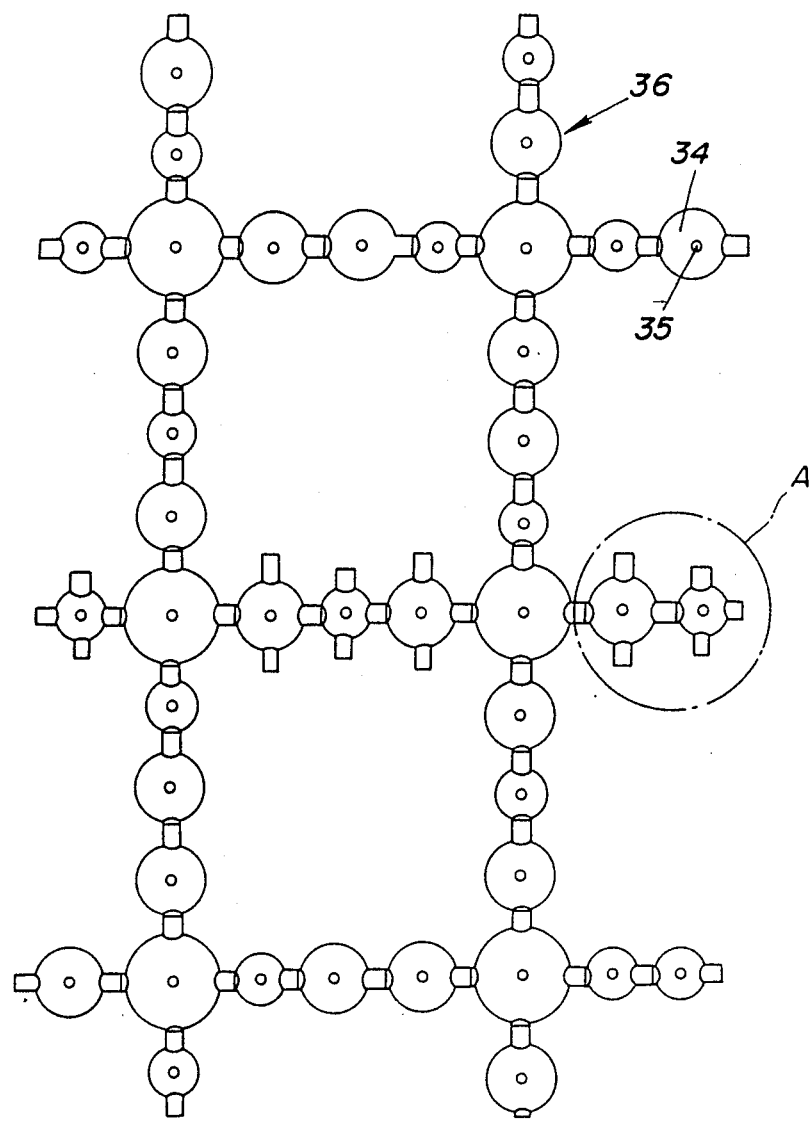
FIG. 31 is a schematic plan view of stuffing elements according to the present invention arranged for use in the case of a cushionlike item.
Figure 34:
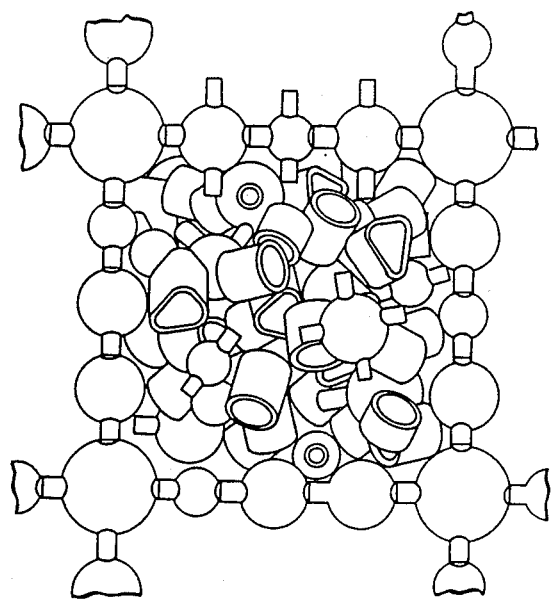
FIG. 34 is a schematic plan view of stuffing elements contained in the case of a cushionlike item according to the invention.

FIG. 31 illustrates a upper plan view of stuffing elements which can be used in a cushionlike item according to the present invention. The elements a large number of hollow spherical elements 34 connected together by means of vertically and horizontally arranged arms to form a gridwork 36 of beads. Such a gridwork of stuffing elements may be used in a bed pad, an automobile seat pad, a pillow or a cushion according to the present invention either in a single-layer or in a multilayer arrangement.

An airing hole 35 is formed on each hollow spherical element 34 of synthetic resin, which, when the element is compressed under the weight of the user, ejects part of the air that has been contained in the element to the surface of the body that lies in contact with the pad. In an embodiment using gridworks of elements as described above, an air inlet valve is provided at each end of the arms of the gridwork in such a manner that the valves become closed when the spherical elements are compressed and the valves become opened the spherical elements are released. It should be noted, however, that provision of such air inlet valves is not a mandatory requirement and that air may be introduced from an end of each of the arms of the gridworks used in the pad and ejected from the hole provided on each of the spherical elements of the gridworks.

A stuffing element of synthetic resin to be used for a cushionlike item according to the invention preferably takes the form of a ball, an oblong ball or a cylinder. Each of the stuffing elements to be used for a cushionlike item according to the invention preferably have different dimensions so that the cushionlike item contains stuffing elements of different sizes for the effect of spot pressure therapy.

While the stuffing elements contained in a cushionlike item according to the present invention are preferably connected to one another in order to ensure a good passage of air therethrough, they need not necessarily be assembled into one piece so long as the arrangement of the elements in the item ensures a good passage of air.

While stuffing elements are assembled into gridworks in the above description and illustrations, they may take different forms of assembly and a plurality of such assemblies may be used in a multilayer construction in order to obtain a desired height for the item.

While a gridwork to be used for a cushionlike item is generally formed in one piece, it may be formed by combining different pieces as illustrated in FIGS. 33(a) through 33(i), each of which consists of a single element or a plurality of elements that comprise arm members that can be connected with one another to form an assembly as shown in FIG. 31.

The connecting arm members illustrated in FIG. 32 consist of two different types, thin arm members 37a and thick arm members 37b the latter of which can be engaged with thin arm members 37a such that they can be connected with one another to form a long and large assembly.

While a stuffing element can have two arm members as shown in FIG. 33(f), four arm members as shown in FIG. 33(a) or six arm members as shown in FIG. 33(e), an element having a large number of arm members may be advantageously used because any unoccupied arm member(s) can provide airing holes and a cushionlike item containing such elements may be provided with an improved airing property.

A cushionlike item according to the present invention can be formed by filling it with stuffing pieces of the type as illustrated in FIG. 31 or with a mixture of such stuffing pieces and stuffing elements having a configuration of short cylinder and those With a configuration of trigonal prism as shown in FIG. 29. The item may also be formed by filling it with a mixture of stuffing pieces as shown in FIG. 31 and those shown in FIGS. 33(a) through 33(i) or any known filling materials. When a cushionlike item is filled with stuffing pieces of the type as shown in FIG. 33 in combination with short cylindrical stuffing elements, the item can exert an excellent effect of spot pressure or massage therapy for curing kinks and sore muscles.

APPLICABLE INDUSTRIAL FIELD OF THE INVENTION

As apparent from the above description, since a cushionlike item according to the invention is provided with a number of ridges formed on its surface with or without projections and filled with stuffing elements of synthetic resin, it has an excellent therapeutic effect of promoting blood circulation and curing kinks and sore muscles as well as a desirable property of providing good airing and also has adaptability to both the user's head or waist, providing a wide range of applications in the field of bed pads, automobile seats, pillows and cushions.

What is claimed is:

1. An item for use as an automobile seat pad, a pillow, a cushion and the like, said item comprising at least one bag-like body having a front surface and a back surface containing a large number of short cylindrical stuffing elements of synthetic resin, a number of strings arranged zigzag between the front and back surfaces thereof and a number of projections provided on the front surface thereof for spot pressure therapy, said projections extending outwardly from the front surface of sufficient distance to apply spot pressure on the user of the item, one of said strings securing each projection to the front surface of the bag-like body, said stuffing elements becoming rigidly held by pulling said strings to make the projections firmly stand on the surface of the item.

2. An item according to claim 1 wherein said string secures a projection by running through a bore in each projection by running through a bore in each projection.

3. An item according to claim 2 wherein said strings each run through at least one hole on an anchor plate on the back surface of the bag-like body.

* * * * *